Patented May 21, 1929.

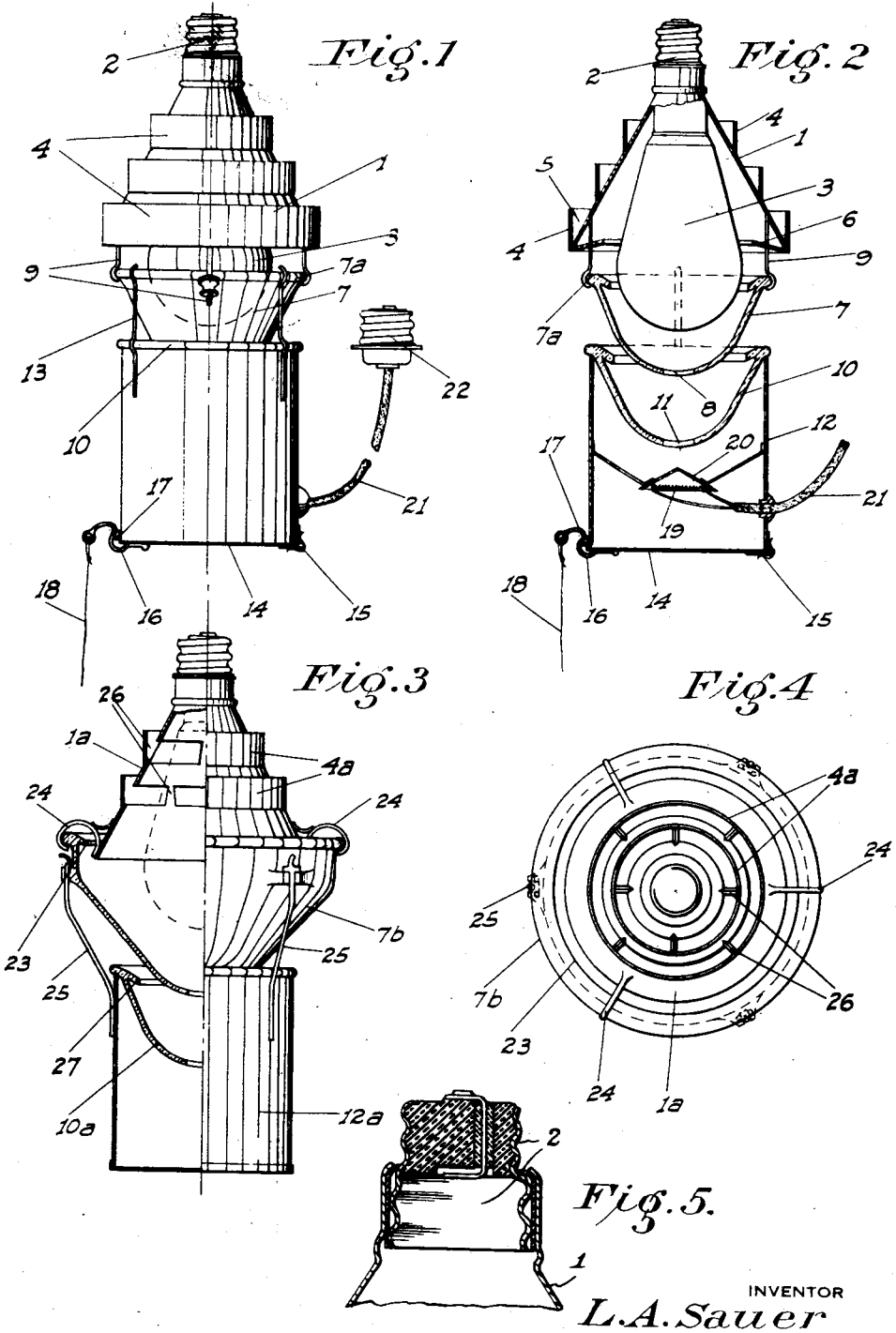

1,713,557

UNITED STATES PATENT OFFICE.

LOUIS A. SAUER, OF WILLOWS, CALIFORNIA.

VERMIN TRAP.

Application filed November 28, 1925. Serial No. 71,901.

This invention relates to improvements in vermin traps, especially to a trap for catching flying insects and the like and which employs artificial light to attract the insects to the trap, and heat from such light to then destroy the insects.

The present invention particularly represents an improvement over the trap shown in my Patent No. 1,564,976, dated December 8th, 1925, and is for the same purpose and with corresponding advantages.

The principal object of this invention is to provide a trap adapted to be used in connection with an electric light bulb, so constructed that the majority of the vermin as trapped will be instantly subjected to the heat from the light, and will drop from adjacent the light into a single catch receptacle adapted to be readily removed or cleaned out whenever necessary.

A further object is to construct the trap of a number of readily detachable parts so that they may be easily disconnected from each other for cleaning out or to enable the light bulb to be removed.

Another object is to connect the main vermin receptacle to the other parts of the trap in such a manner that the receptacle may be removed or cleaned out without disturbing the light bulb.

A still further object is to arrange the trap so that it may be connected to a standard light socket without depending on the bulb for support, and which permits the bulb to be placed in or removed from the trap without detaching the trap itself from the socket.

A still further object is to provide additional heating means over what is provided by the bulb itself for destroying the vermin in the trap receptacle in the event that the heat of the bulb should prove insufficient for the purpose.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figs. 1 and 2 are side and sectional elevations respectively of one form of my improved trap, this being a type especially adapted to be used in connection with a light bulb positioned high up or where the trap cannot be reached by a person without the use of a stepladder or the like.

Fig. 3 is a combined vertical section and elevation of a modified form of trap to be used in connection with a light bulb set at a normal or convenient height.

Fig. 4 is a top plan view of the form of trap shown in Fig. 3.

Fig. 5 is a sectional view of the combined plug and socket member mounted in connection with the device..

Referring now more particularly to the characters of reference on the drawings, and particularly at this time to Figs. 1 and 2, the upper part of the trap comprises a substantially cone-shaped hood 1 preferably of sheet metal so as to readily be influenced by the heat from a bulb and so that it may also serve as a reflector. At its apex the hood is mounted in permanent connection with a combined plug and socket element 2, such as can be purchased in the open market. The plug of course is outwardly of the hood and is adapted for insertion into an ordinary light socket. The socket portion of the element 2 is inwardly of the hood and is arranged to receive the base of a standard electric light bulb 3 of suitable character. The hood is of such diameter as to provide considerable open space around the bulb, and its depth relative to that of the bulb is such that the latter projects a considerable distance below the hood. This permits the majority of the light from the bulb to be utilized for room lighting purposes as well as for attracting vermin to the trap.

On the outside of the hood is a plurality of vertical flanges 4 vertically spaced to form a number of continuous trapping pockets 5 of V-shaped cross section.

Another flange 6 having an upward slope projects inwardly around the bottom of the hood to form an interior trapping pocket. These features are fully shown and described in my patent above referred to, and do not in themselves form a part of the present invention.

Surrounding the bulb 3 in spaced relation thereto and to the bottom of the hood is a bowl 7 of translucent material such as glass. The interior of the bowl is rounded toward the bottom, which is provided with a central orifice 8. The diameter of the bowl is larger than that of the hood opening outlined by the flange 6.

This bowl is supported in suspended relation from the hood by means of spring clips 9 mounted on and depending from the latter and engaging the rim bead $7^a$ of the bowl.

Positioned a certain distance below the bowl 7 is another bowl 10 concentric with said bowl 7 and preferably of the same size and shape and having a central bottom opening 11. This bowl depends into a receptacle 12 and is supported by the rim thereof. This receptacle is removably suspended from and supported by the bowl 7 by means of spring clips 13 or the like projecting upwardly from the outside of the receptacle and engaging the bowl rim $7^a$.

The bottom 14 of the receptacle is in the form of a door connected to one edge of the side of the receptacle by a spring hinge 15 which acts to hold the door closed. Attached to the door on the side opposite the hinge is a spring catch 16 arranged to automatically engage a lug 17 on the receptacle. A pull cord 18 is applied to the catch, the latter being so arranged that when the cord is pulled the catch will be disengaged from the lug. The catch itself being mounted on the door, a continuous pull on the cord will of course cause the door to be opened against the resistance offered by the spring hinge.

Any vermin in the receptacle will then of course fall out, and since the door extends across the entire bottom area of the receptacle no ledges or pockets are formed which might cause some of the vermin to be retained in the receptacle.

In operation the hood 1 becomes of course highly heated when the bulb 3 is lit. Any vermin therefore contacting with the outside of the hood will be instantly crippled and will slide into the pockets 5. Vermin attracted by the light either fly between the hood and the bowl 7 or between the two bowls which are also maintained at considerable heat on account of their close relationship to the light bulb.

Vermin flying up inside the hood will be instantly crippled by contact with the bulb or hood and will fall around into the pocket formed by the flange 6 or into the bowl 7. The surface of the latter being smooth the vermin will slide down through the central orifices 8 and 11 and into the lower receptacle 12. From there the vermin are removed when desired by opening the door 14 as above described.

To provide additional heating means for destroying the vermin should the heat from the bulb 3 be insufficient, I suspend an electric heating element 19 in the receptacle centrally thereof. The element is covered by a cone shaped hood 20 so that vermin dropping through the orifice 11 will not come in actual contact with the element but will fall onto and be crippled by the heat of the hood, sliding thence to the bottom of the receptacle. The leads 21 from the element extend through the side of the receptacle and are attached to a standard form of plug 22 which may be attached to an ordinary double socket connection interposed between the plug 2 and a standard light socket.

In the form of device shown in Figs. 3 and 4, the fundamental features remain substantially the same as those above described.

This device comprises a flanged hood $1^a$ corresponding to the hood 1; centrally orificed translucent bowls $7^b$ and $10^a$ corresponding to the bowls 7 and 10; and a receptacle $12^a$ corresponding to the receptacle 12, and which supports the bowl $10^a$.

The bowl $7^b$ however is greater in diameter than the hood $1^a$ at the bottom and projects somewhat above the same. This bowl has a downward slanting and interior flange 23 around its rim which leaves a passage between the hood and flange of sufficient width for the easy passage of vermin downwardly therepast. At the same time the flange and the lower end of the flaring hood projecting into the bowl, tend to prevent any vermin when once between the hood and the bowl from escaping upwardly through the passage. The bowl $7^b$ is removably suspended from the hood by suitable metal clips 24 engaging the rim of the bowl, while the receptacle $12^a$ is removably suspended from the bowl $7^b$ by spring clips 25 of suitable character.

The hood $1^a$ however is preferably open around the bottoms of the flanges $4^a$, as plainly shown in Fig. 3, bracing or strengthening connections between the nearly separated portions of the hood and the flanges being had by means of radial ribs 26, preferably of tapered cross section and disposed in staggered relation as shown in Fig. 4.

By reason of this arrangement, together with the other features of construction of this type of trap, all vermin caught by the hood pockets, or entering the bowls $7^b$ and $10^a$, are automatically deposited in the single receptacle $12^a$. This renders all the trapping elements self-cleaning, so that only the bowl needs to be removed and cleaned of its contents.

I may also form the bowl $10^a$ with an inwardly projecting flange 27, around its rim, similar to the flange 23, and acting to prevent any vermin from crawling out of said bowl. This feature may also of course be incorporated in bowls 7 and 10 of the first described type of trap.

Since this device is intended to be hung where the receptacle can be conveniently reached and removed from below by any person, it is not necessary to have a downwardly opening door for such receptacle as in the first type; but it will be evident that the receptacle can be provided with such a door if desired.

Also of course though not shown the additional heating means described in connection with the first type can also be mounted in the receptacle 12ª if found advisable.

If the hood itself is made of translucent material, as well as the bowls, the full benefit of the light will of course be obtained.

When the bottom of the collecting receptacle is made so that it can be opened or removed, the bowl or bowls thereabove may be formed therewith as a unit if desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A vermin trap comprising a hood to surround a source of artificial light, a trapping bowl disposed under the hood in spaced relation thereto, said bowl having a bottom orifice, and a receptacle into which said orifice discharges.

2. A vermin trap comprising a hood to surround a source of artificial light, a trapping bowl disposed under the hood in spaced relation thereto, said bowl having a bottom orifice, a receptacle into which said orifice discharges, means removably supporting the bowl from the hood, and means removably supporting the receptacle from the bowl.

3. A vermin trap comprising a hood to surround a source of artificial light, a trapping bowl disposed under the hood in spaced relation thereto, said bowl having a bottom orifice, a receptacle below the bowl and supported therefrom, and another bowl supported directly by and resting on the rim of the receptacle and depending into the same; said last named bowl having a bottom orifice.

4. A vermin trap including, with a source of artificial light and heat, a catching receptacle disposed below said source, an electric heating element suspended in the receptacle, and a cone shaped hood over the element.

5. A vermin trap comprising a hood to surround a source of artificial light, a translucent trapping bowl disposed under the hood in spaced relation thereto, said bowl having a bottom orifice, a receptacle below the bowl and supported therefrom, a heating element in the receptacle directly below the bowl opening and spaced therefrom, and a cone shaped hood over the element.

In testimony whereof I affix my signature.

LOUIS A. SAUER.